United States Patent [19]
Sugiura et al.

[11] Patent Number: 5,278,919
[45] Date of Patent: Jan. 11, 1994

[54] IMAGE AREA DETERMINING APPARATUS

[75] Inventors: Masashi Sugiura; Yosuke Takashima, both of Tokyo, Japan

[73] Assignee: NEC Corporation, Japan

[21] Appl. No.: 843,904

[22] Filed: Feb. 27, 1992

[30] Foreign Application Priority Data

Feb. 27, 1991 [JP] Japan .................................. 3-033206

[51] Int. Cl.5 .............................................. G06K 9/34
[52] U.S. Cl. ........................................ 382/9; 358/453; 358/462; 358/465; 382/28; 382/50
[58] Field of Search ............. 382/9, 27, 50–53; 28; 48; 358/448, 449, 452, 453, 462, 465–; H04N 1/30, 1/40

[56] References Cited

U.S. PATENT DOCUMENTS

| 4,503,556 | 3/1985 | Scherl et al. | 382/9 |
| 4,547,811 | 10/1985 | Ochi et al. | 382/9 |
| 4,741,046 | 4/1988 | Matsunawa et al. | 382/9 |
| 4,750,209 | 7/1988 | Shimura et al. | 382/9 |
| 4,893,188 | 1/1990 | Matakami et al. | 382/9 |
| 4,905,294 | 2/1990 | Sugiura et al. | 382/50 |

*Primary Examiner*—Joseph Mancuso
*Attorney, Agent, or Firm*—Ostrolenk, Faber, Gerb & Soffen

[57] ABSTRACT

An image area determining apparatus acquires a multi-value image to determine to which one of a picture area and a character area an image signal of the multi-value image belongs. A density detecting unit detects whether or not a density value of the multi-value image is within a range between two preset density threshold values. A density variation amount detecting unit detects whether or not a variation amount of the density value of the multi-value image is less than a preset density variation threshold value. The determining apparatus determines that the multi-value image is related to a picture area when the density value of the received multi-value image is within the range between the two density threshold values and the density value variation amount of the multi-value image is less than the density variation threshold value.

9 Claims, 9 Drawing Sheets

FIG. 3

| 0 | −1 | 0 |
|---|---|---|
| −1 | 4 ← OBJECTIVE PICTURE SIGNAL | −1 |
| 0 | −1 | 0 |

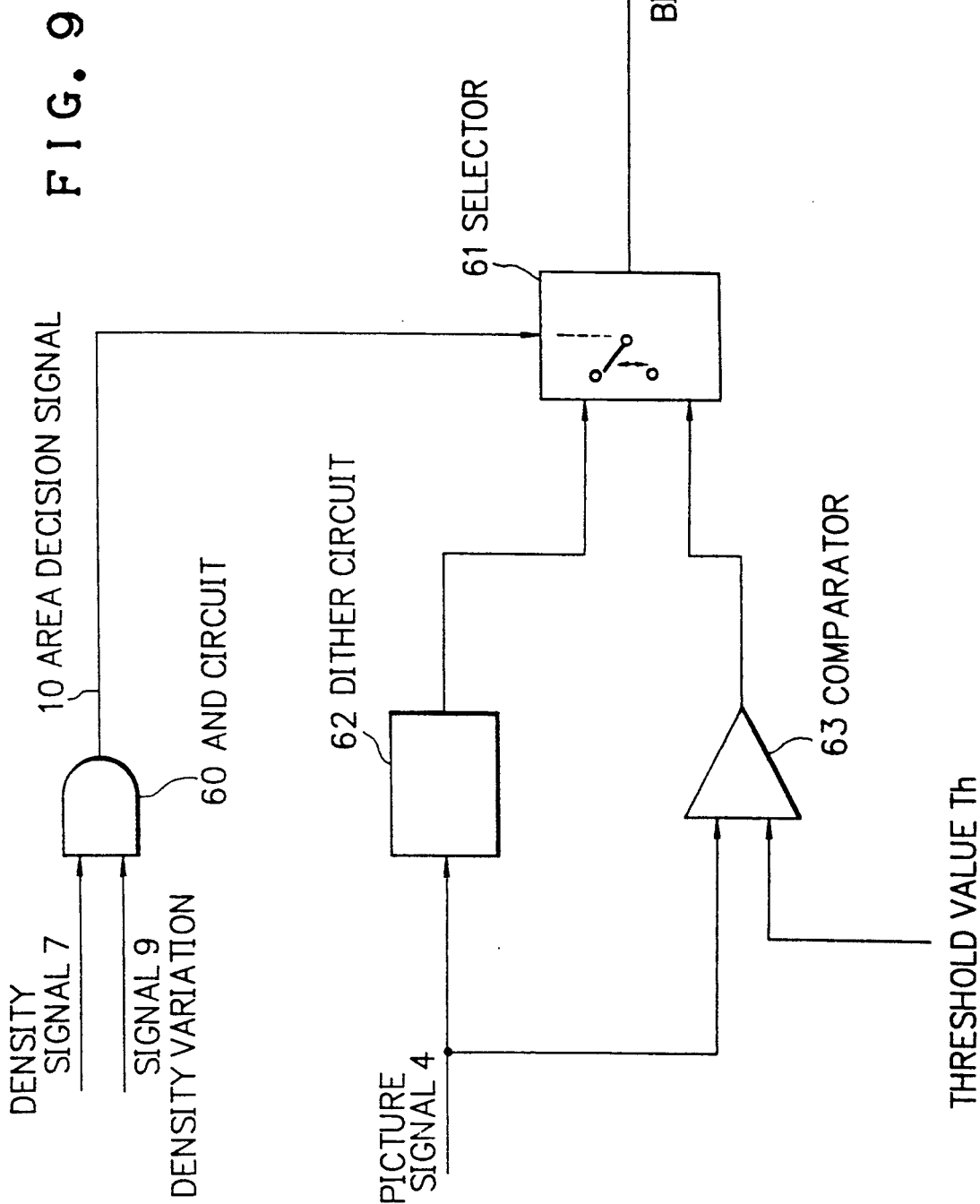

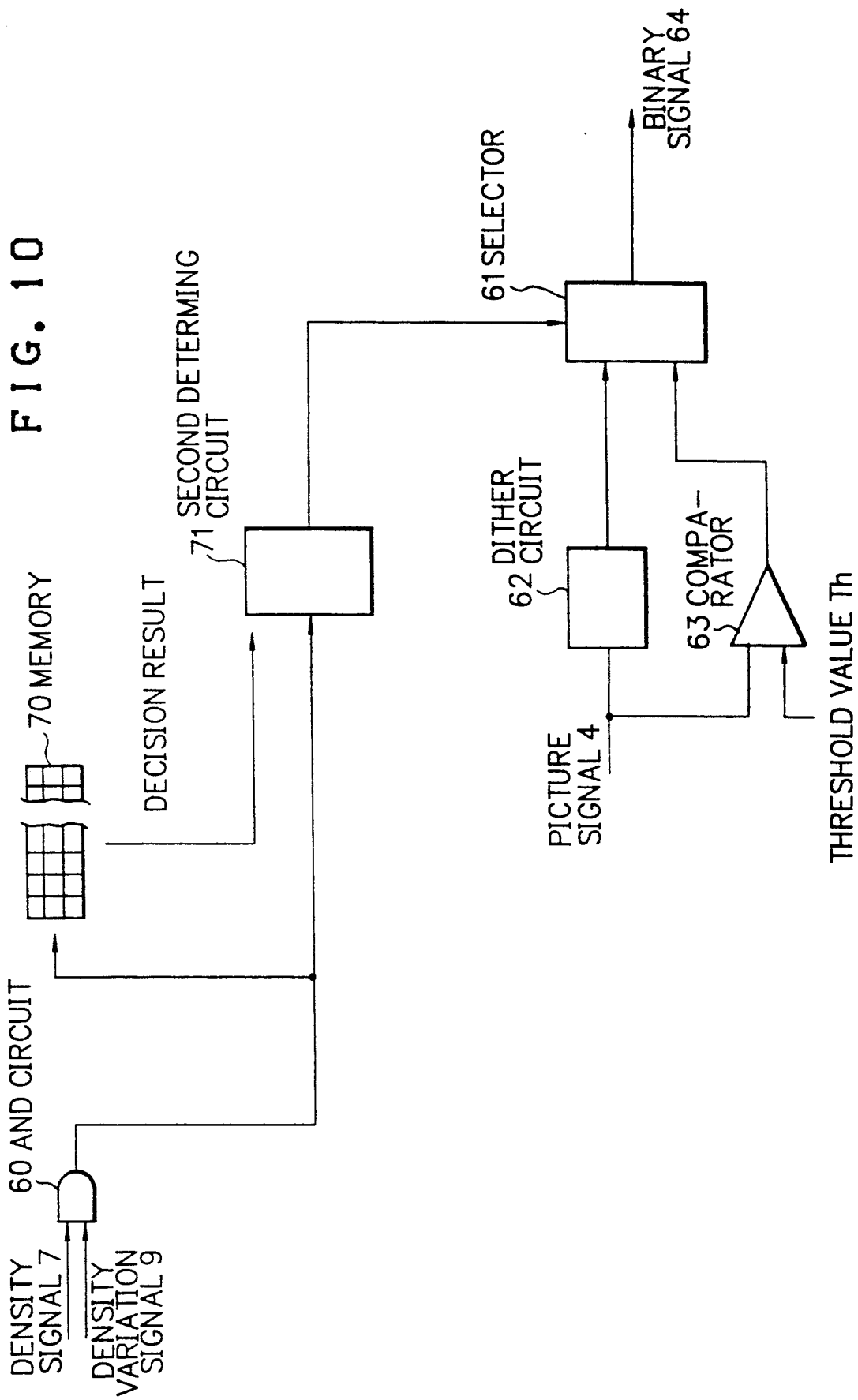

1

IMAGE AREA DETERMINING APPARATUS

BACKGROUND OF THE INVENTION

The present invention relates to an apparatus for acquiring or receiving a multi-value image, and in particular, to an apparatus for determining an image area.

DESCRIPTION OF THE PRIOR ART

In processing of general images, there has been employed a method in which for an image of a character, the difference between a density of the character and that of its background image is emphasized to obtain a clear contour of the character; whereas, for an image of a picture, the density level of the image is correctly developed to attain a picture with a satisfactory gradation or gray-scale representation with a high fidelity.

However, when processing an image including characters and pictures, these requirements are contradictory to each other. This leads to a problem that when a character region is emphasized, the gradation of the picture region becomes different from that of the original image. Conversely, when the picture region is emphasized, the contour of the obtained character image becomes unclear.

In order to solve the problem, it is necessary to appropriately discriminate between a character area and a picture area in the image so as to emphasize the density difference in the character area and to develop the image with a high-fidelity gradation for the picture area.

However, in the conventional apparatus, the character region is determined according to a so-called pattern recognition method, which leads to a disadvantage that the size and cost of the apparatus is increased. Heretofore, there has been proposed a method in which the character region is discriminated only by an amount of change in density. However, this method has been attended with a problem that the background field of the character region is identified as a picture area.

SUMMARY OF THE INVENTION

It is therefore an object of the present invention to provide a novel image area determining apparatus capable of solving the problems associated with the prior art.

In accordance with the present invention, there is provided an image area determining apparatus comprising density value comparing means for comparing a density value of a multi-value image inputted thereto with each of two preset density threshold values, thereby producing information denoting whether or not the density value is within a range between the two density threshold values; density value variation amount comparing means for comparing an amount of variation in the density value of the multi-value image with a preset density variation threshold value, thereby generating information designating whether or not the variation amount of the density value is less than the density variation threshold value; and area determining means for receiving information respectively outputted from said density value comparing means and said density value variation amount comparing means to determine an image area of the multi-value image. The area determining means determines that the multi-value image is related to a picture area when the density of the received multi-value image is within the range between the two density threshold values and the density value variation amount of the multi-value image is less than the density variation threshold value. In other cases, the area determining means determines that any area other than the area above is associated with a character area.

BRIEF DESCRIPTION OF THE DRAWINGS

The objects and features of the present invention will become more apparent from the consideration of the following detailed description taken in conjunction with the accompanying drawings in which:

FIG. 3 is a diagram schematically showing coefficient value of a high-pass filter constituted with 3×3 pixels as an examples of density variation amount detecting means in a density variation detecting circuit 2 in the apparatus of FIG. 1;

FIG. 9 is a diagram showing the circuit configuration of an area determining circuit 3 of FIG. 1 and circuits associated therewith in an embodiment according to the present invention; and FIG. 10 is a diagram showing the circuit configuration of an area determining circuit 3 of FIG. 1 and circuits associated therewith in another embodiment according to the present invention.

DESCRIPTION OF THE PREFERRED EMBODIMENTS

Figure 1:
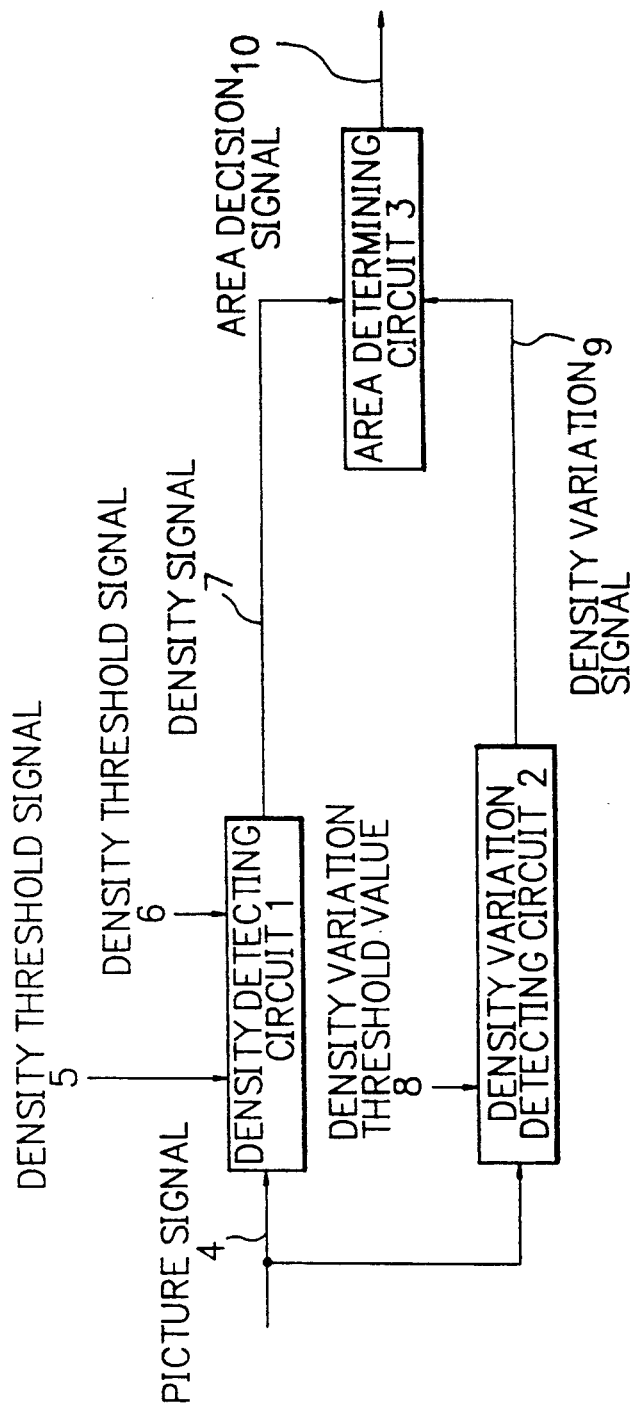
FIG. 1 is a schematic block diagram showing an image area determining apparatus in an embodiment in accordance with the present invention.

Referring now to the drawings, a description will be given in detail of an embodiment in accordance with the present invention.

The present invention has been devised to accurately and easily discriminate between character and picture areas of an image. To this end, density information and density variation amount information of the image are both employed in the present invention.

In a general image, a character portion and a background portion in a character area have an intermediate density in many cases. Moreover, in most cases, the area includes a character portion of a very high density in a background portion of a very low density or conversely density in many cases. Moreover, in most cases, the area includes a character portion of a very high density in a background portion of a very low density or conversely includes a character portion of a very low density in a background portion of a very high density.

Moreover, the amount of spatial density variation is developed such that in a periphery of the character portion, the value of density greatly changes at a very small frequency; whereas, the value of density rarely varies in the background portion.

On the other hand, in an ordinary photograph, a portion of an extremely high or low density hardly appears. Even in a picture of a shade of an object, a cloud in the sky, or the like, the density thereof is not beyond the range of density of the character area. Namely, a certain intermediate density level is obtained in a usual case. Furthermore, the amount of variation in the density is lower than that developed in the periphery of the character portion. That is, there rarely takes place a portion in which the density abruptly alters.

In a case where the character and picture areas, respectively, having the above characteristics are desired to be discriminated from each other only by the density variation amount, it is impossible to discriminate the background portion of the character area from the picture area.

If the density value is added as an identification parameter to those above, a portion of an extremely high or low density can be identified as a background portion of the character area, thereby discriminating the picture area from the background portion of the character area.

In accordance with the present invention, the density of an image and the density variation amount thereof are continuously monitored. When the image density has a certain intermediate density level and the density variation amount is small, the image area is assumed to be a picture area. Any other portion having an extremely high or low density level and any portion in which the density variation amount takes a high value are assumed to be related to the character area.

FIG. 1 shows an embodiment of an image area determining apparatus in accordance with the present invention.

Referring to FIG. 1, a multi-value image supplied from a scanner is delivered in the form of an image or picture signal 4 to the circuit configured in accordance with the present invention. The picture signal 4 takes levels of multiple values. For example, if the signal 4 consists of eight bits, there can be developed levels 0 to 255. It is assumed that level 0 indicates a complete white, level 255 denotes a complete black color, and the other intermediate levels therebetween correspond to colors of density values which are respectively associated with the respective levels assigned thereto.

The picture signal 4 is first inputted to a density detecting circuit 1. At the same time, the circuit 1 receives preset density threshold values 5 and 6 to determine whether the picture signal 4 has a density level between the density threshold values 5 and 6. If this is the case, a density signal 7 having a value "1" indicating the on state is produced; otherwise, a density signal 7 having a value "0" designating the off state is generated.

Figure 4:
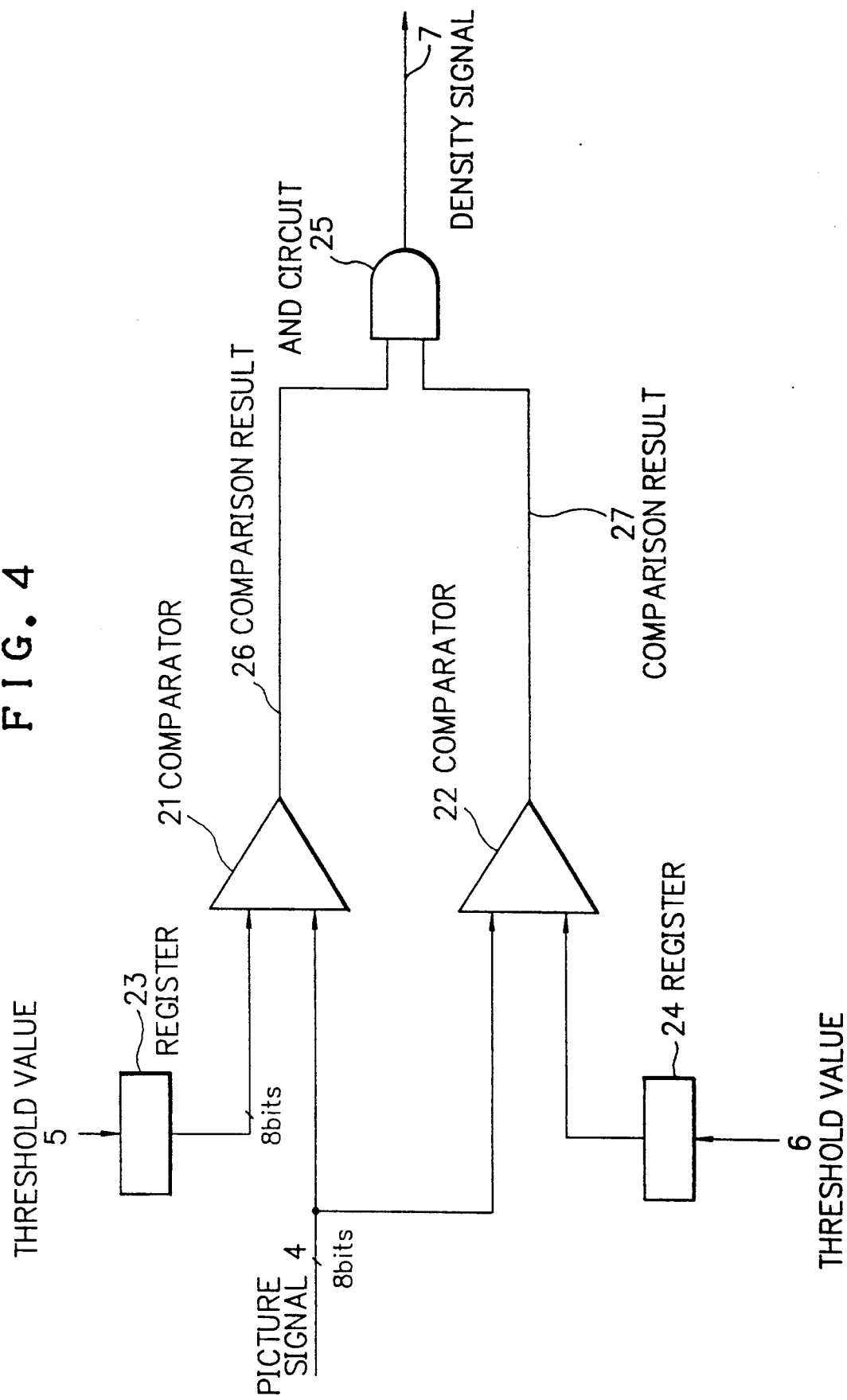
FIG. 4 is a simplified circuit diagram showing a circuit configuration of an embodiment of a density detecting circuit 1 of FIG. 1.

FIG. 4 shows a specific configuration of the density detecting circuit 1 in which clocks to be used to transfer data and peripheral circuits not directly related to description of the present invention are not shown.

The picture signal 4 includes eight bits per pixel and represents a density level ranging from 0 (white) to 255 (complete black).

A comparator 21 compares the density level of the picture signal 4 with that of the threshold value 5 kept in a register 23. If the density level of the threshold value 5 is greater than that of the picture signal 4, a signal of level 1 indicating the on state is produced as a comparison result 26; otherwise, a signal of level 0 indicating the off state is produced as a comparison result 26.

At the same time, the picture signal 4 is also sent to a comparator 22 to be compared with a density level of the threshold value 6 kept in a register 24. The comparator 22 compares the density level of the picture signal 4 with that of the threshold value 6 kept in a register 24. If the density level of the picture signal 4 is greater than that of the threshold value 6, a signal of level 1 indicating the on state is produced as a comparison result 27; otherwise, a signal of level 0 indicating the off state is produced as a comparison result 27.

In this regard, the registers 23 and 24 are, respectively, beforehand supplied with predetermined threshold values from a keyboard or the like.

The comparison results 26 and 27 are fed to an AND circuit 25 to produce a logical product therebetween. An obtained logical product is outputted therefrom as a density signal 7. Consequently, when both the comparison results 26 and 27 are generated, namely, when the density level of the picture signal 4 is between the density levels respectively associated with the threshold values 5 and 6, the density signal 7 is produced.

Figure 5:
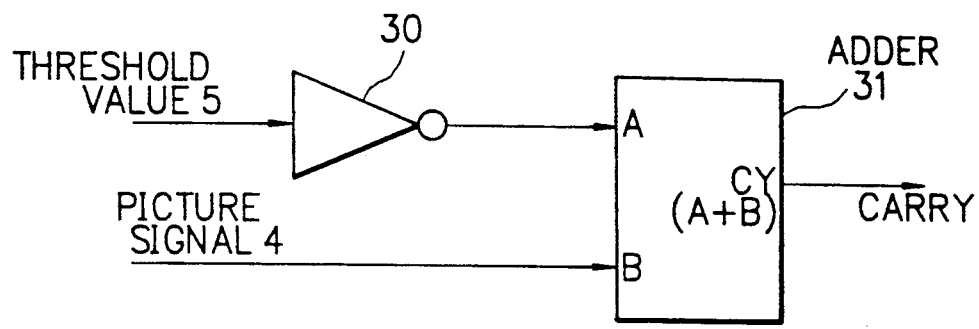
FIG. 5 is a diagram showing a circuit structure of an embodiment of comparators 21 and 22 of FIG. 4.
Figure 6:
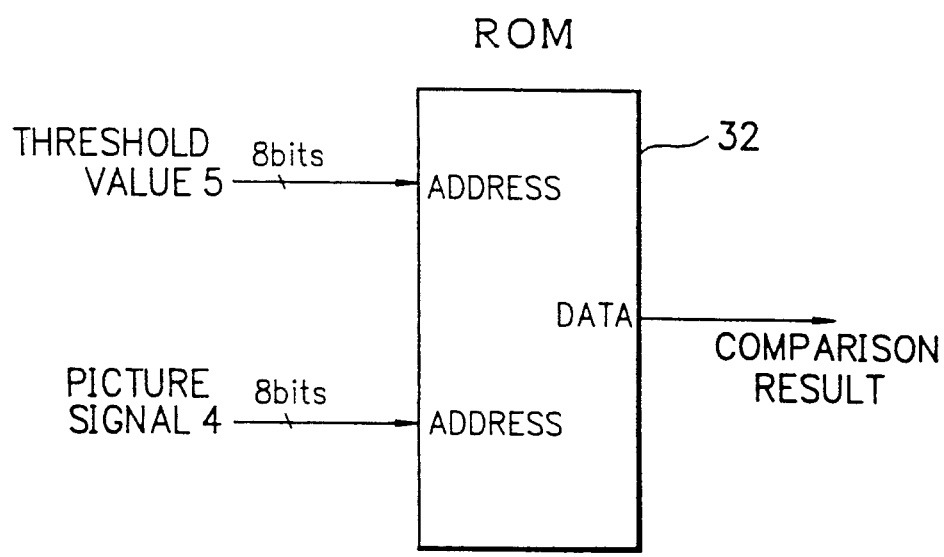
FIG. 6 is a diagram showing another embodiment of the comparators 21 and 22 of FIG. 4.

The comparators 21 and 22 may be of any circuit configuration so long as the levels of two signals can be compared with each other. For example, as shown in FIG. 5, the comparator may be constructed with an inverter 30 and an adder 31 in which an input signal is converted into a complement to be added to another input signal such that a carry as a result of the addition is used as a comparison result. Alternatively, as shown in FIG. 6, the comparator may be constituted in a one-bit wide read-only memory (ROM) 32 in which the value of the picture signal 4 and that of the threshold value 5 are employed as addresses so as to store therein a result of comparison therebetween.

When the picture signal 4 and the threshold value 5 are each represented by analog signals, it is only necessary to use capacitors for the registers 23 and 24 and simple amplitude comparators for the comparators 21 and 22.

Returning now to FIG. 1, the picture signal 4 delivered to the density detecting circuit 1 is also fed to a density variation detecting circuit 2 at the same time. The density variation detecting circuit 2 continuously monitors the value of the picture signal 4. If the amount of variation in the density level of the picture signal 4 is less than a value of a preset density variation threshold value 8, a signal of level 1 denoting the on state is produced as a density variation signal 9; otherwise, a signal of level 0 denoting the off state is produced as a density variation signal 9.

Figure 7:
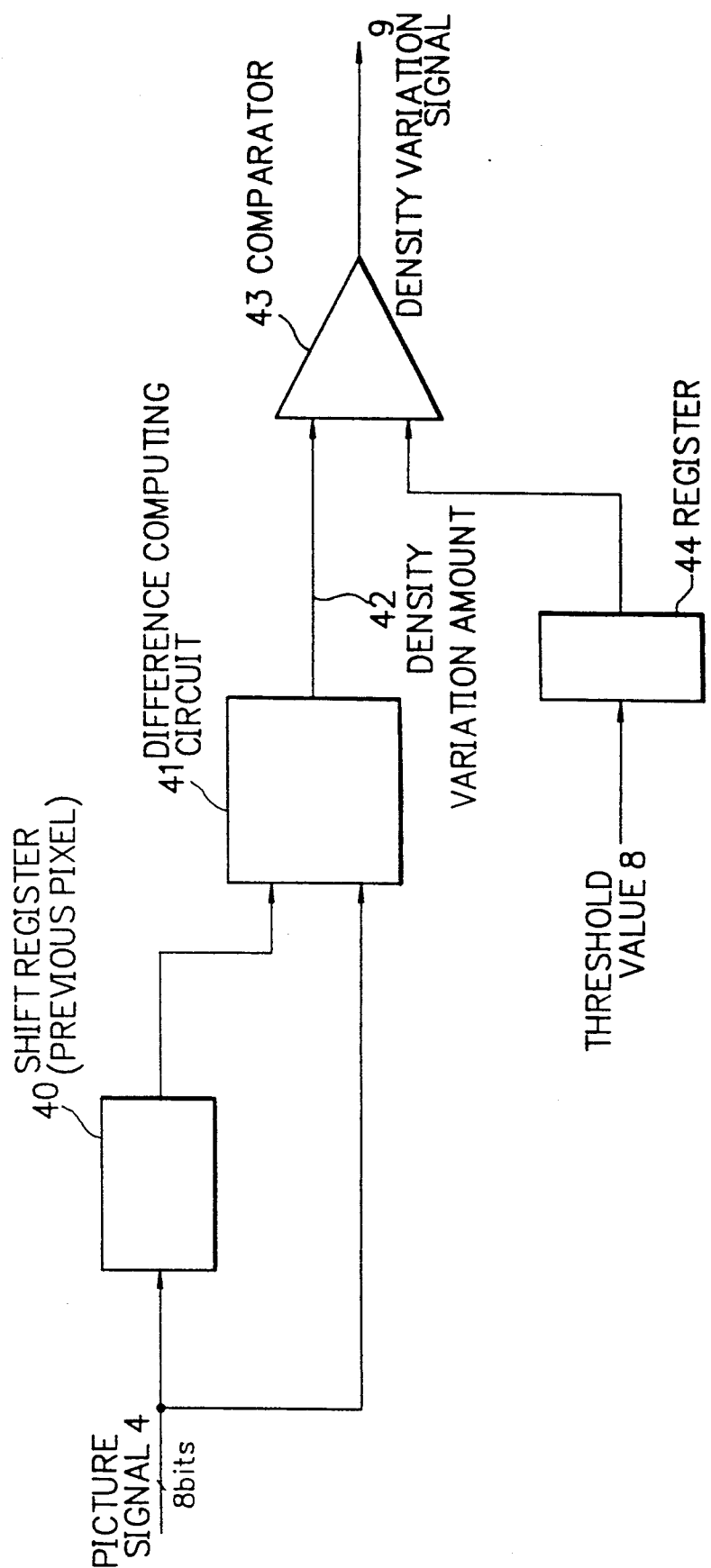
FIG. 7 is a schematic diagram showing an embodiment of the density variation detecting circuit 2 in the apparatus of FIG. 1.

FIG. 7 shows an example of a specific constitution of the density variation detecting circuit 2 in which the amount of variation in the density level takes a large value between a picture signal of an objective pixel and a picture signal of the previous pixel. Clocks to be used to transfer respective data and peripheral circuits not directly associated with the description are not shown in FIG. 7.

The picture signal 4 is once stored in the shift register 40 to be kept therein at a transfer clock timing of the picture signal 4, the transfer clock timing being not shown in FIG. 7. In consequence, when the inputted picture signal 4 indicates a density level of an n-th pixel, the output from the shift register 40 represents a density level of an (n−1)th pixel.

The picture signal 4 and the output signal from the shift register 40 are fed to a difference computing circuit 41. The circuit 41 computes a difference between the picture signal 4 and the output signal from the shift register 40, namely, an absolute value of the difference between the density level of the objective picture signal 4 and that of the previous pixel. A resultant signal of the difference is sent as a density variation amount 42 to a comparator 43.

The comparator 43 compares the density variation amount 42 with the threshold value 8 kept in the register 44. If the density variation amount 42 is less than the threshold value 8, a density variation signal 9 of a level 1 denoting the on state is produced; otherwise, a density variation signal 9 of a level 0 denoting the off state is created.

Although only the difference between the density levels of an objective pixel and a pixel immediately preceding the objective pixel is employed as the density variation amount, the present invention is not restricted by this embodiment. Namely, a difference between the density level of an objective pixel and a mean value of density levels of a plurality of pixels in the neighborhood of the objective pixel may be adopted. In this case, moreover, the density levels of the plural pixels may be appropriately weighted before the calculation of the mean value.

Figure 8:
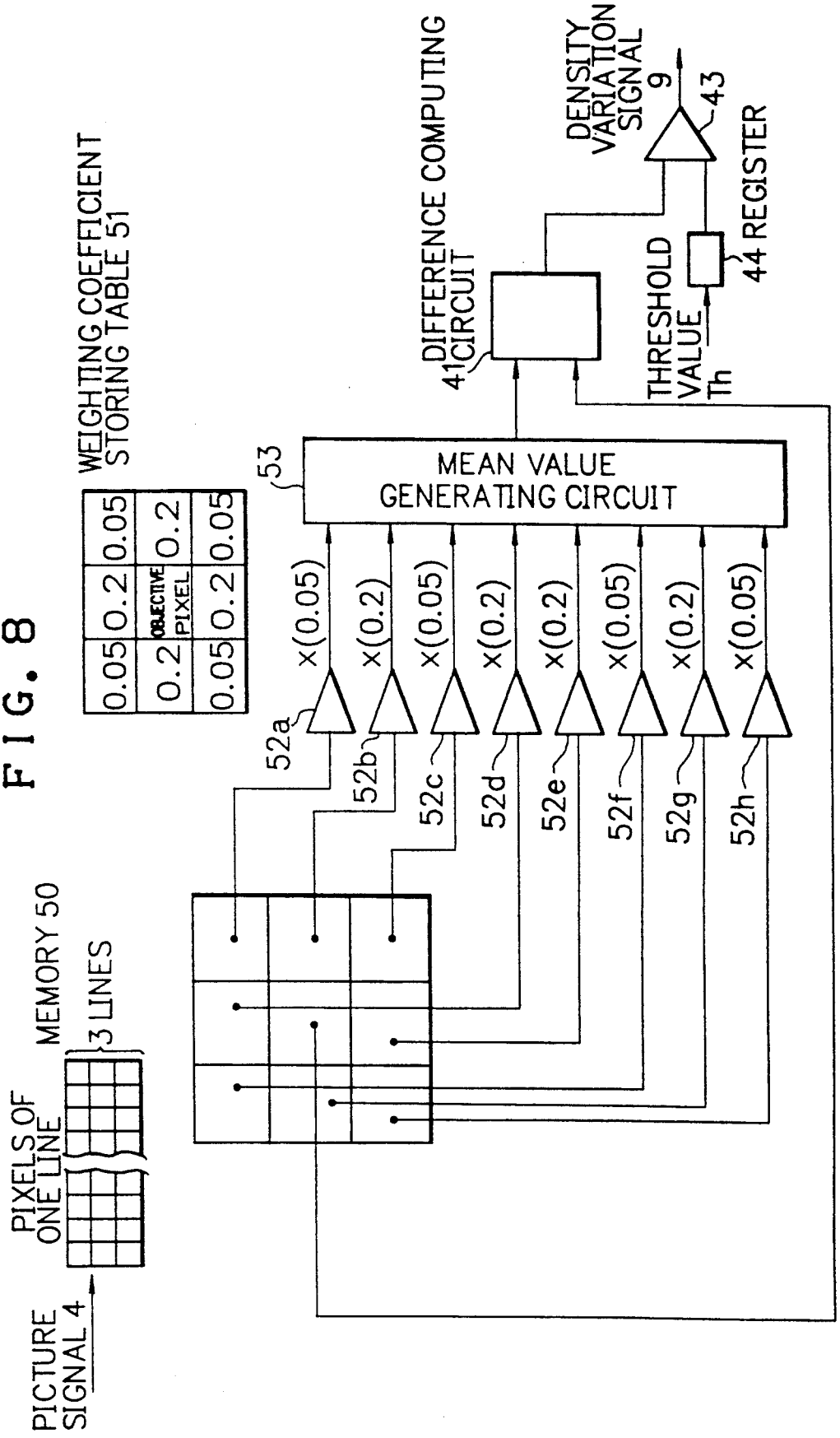
FIG. 8 is a diagram showing another embodiment of the density variation detection circuit 2 in the apparatus of FIG. 1.

FIG. 8 shows an example of an embodiment in which the density variation amount is computed as a density difference between a density level of an objective pixel and a mean value of density levels of a plurality of pixels in the proximity of the objective pixel, the density levels being appropriately weighted before the computation of the mean value. The difference between this constitution and the first configuration example of FIG. 7 is as follows. To facilitate the processing, a picture signal of each pixel is temporarily loaded in a memory 50. Thereafter, the picture signals of the respective pixels are read therefrom as described below. The picture signal of an objective pixel and those of pixels in the vicinity thereof are obtained from the memory 50 such that weighting coefficients assigned to the pixels based on relative positions respectively thereof from the objective pixel are read from a weighting coefficient storing table 51 to be multiplied by the associated picture signals by amplifiers 52a to 52h, thereby calculating a mean value thereof by a mean value generating circuit 53. The density variation amount is obtained as a difference between the mean value and the density of the objective pixel.

An area determining circuit 3 (FIG. 1) determines, only when each of the density signal 7 and the density variation signal 9 is in the on state, that the picture signal 4 belongs to a picture area and then produces an area decision signal 10 of level 1 denoting the picture level. In other cases, the circuit 3 generates a signal of level 0 indicating that the picture signal 4 is associated with a character area.

Figure 2:
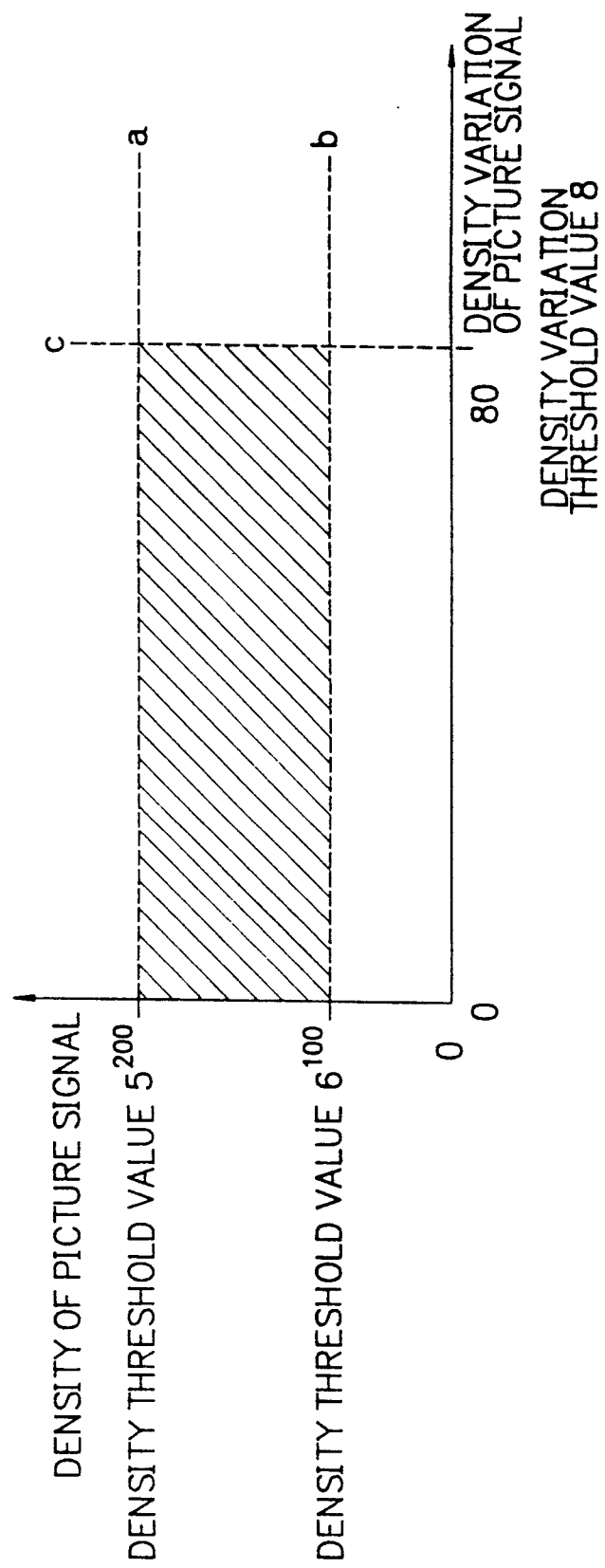
FIG. 2 is a graph showing a relationship between a density level and a variation in density of an image signal 4 in the embodiment of FIG. 1.

The above operation will now be described in detail by referring to FIG. 2 showing a relationship between the density level and the density variation level of the picture signal 4.

FIG. 2 is a graph of which the ordinate and abscissa stand for the density level and the density level variation amount of the picture signal 4, respectively. In this example, the density threshold values 5 and 6, and the density variation threshold value 8 are assumed to be density levels 200 and 100 and a density variation level 80, respectively. The density threshold values 5 and 6 and the density variation threshold value 8 described in conjunction with FIG. 1 are drawn as horizontal lines a and b and a vertical line c, respectively. In consequence, the density signal 7 of FIG. 1 is checked to determine whether or not the density level of the input picture signal 4 exists between the horizontal lines a and b, namely, between the density levels 200 and 100. Specifically, the density variation detecting circuit 2 determines that the variation amount of the density level of the picture signal 4 is on the left-hand side of the vertical line c, namely, the density level variation is equal to or less than 80.

Since the area decision signal 10 is set to the on state only when each of the density signal 7 and the density variation signal 9 is in the on state, when the picture signal is in the central shadow portion of the graph, namely, the density level of the image takes a certain intermediate value and the variation of the density level is not abrupt, the picture signal 4 is determined to be in a picture area. In other cases, namely, when the density level of the image takes an extremely high or low value and the variation of the density level is abrupt, the picture signal 4 is determined to be in a character area.

In this connection, the density threshold values 5 and 6 and the density variation threshold value 8 are beforehand determined based on experiences.

FIG. 9 shows a first example of a specific configuration of the area determining circuit 3 and circuits associated therewith. In this circuit constitution, depending on a determined area, the processing is changed over between an operation in which a multi-value picture signal undergoes a simple binarization and an operation in which the picture signal 4 is processed in accordance with dithering method.

In FIG. 9, an AND circuit 60 produces, when each of the density signal 7 from the density detecting circuit 1 and the density variation detection signal 9 from the density variation detecting circuit 2 is in the on state, an area decision signal 10 of level 1 denoting the on state.

That is, when the density detecting circuit 1 determines that the density level of the objective pixel is within a preset range and the density variation detecting circuit 2 determines that the variation amount between the density of the pixel and that of the previous pixel is within a preset range, the pixel is assumed to be in a picture area and there is produced an area decision signal 10 of level 0 designating the off state.

The area decision signal 10 is delivered to a selector 61. The selector 61 selects an output result from a dither circuit 62 or a comparator 63 when the area decision signal 10 is at level 1 or 0, namely, when the objective pixel belongs to the picture area or the binary image area, respectively.

In this circuit example, consequently, for the pixel assumed to be in the picture area, the picture signal is binarized through a dither processing by the dither circuit 62 using a pseudo half tone, thereby producing a binary signal 64. For the pixel assumed to be in the binary image area, the picture signal 4 is subjected to a simple binarization by the comparator 63, which resultantly generates a binary signal 64.

FIG. 10 is a second example of an embodiment of the area determining circuit 3 and circuits associated therewith. In addition to the first construction example of FIG. 9, to minimize the decision error, the circuit structure of FIG. 10 includes a memory 70 for storing therein information denoting to which one of the picture and character areas the pixels in the vicinity of an objective pixel are assumed to belong and a second determining circuit 71 for finally determining the area of the pixel based on both the results stored in the memory 70 and the decision result of the pixel.

The second determination circuit 71 references decision results of pixels in a range of proximity of the objective pixel for which the area thereof is to be finally determined so as to determine the area of the pixel based on a majority decision in accordance with the number of pixels assumed to be in the picture area and that of pixels assumed to be in the binary image area. Moreover, the number of areas of the pixels to be referenced may be multiplied by weighting coefficients determined according to relative positions of the pixels with respect to the objective pixel, thereby deciding the area of the objective pixel based on the majority decision.

In this regard, for the operation of the density variation detecting circuit, the picture signal 4 may be fed to a high-pass filter such as a differentiating circuit, thereby using a value resultant therefrom as a density variation amount.

Figure 3:
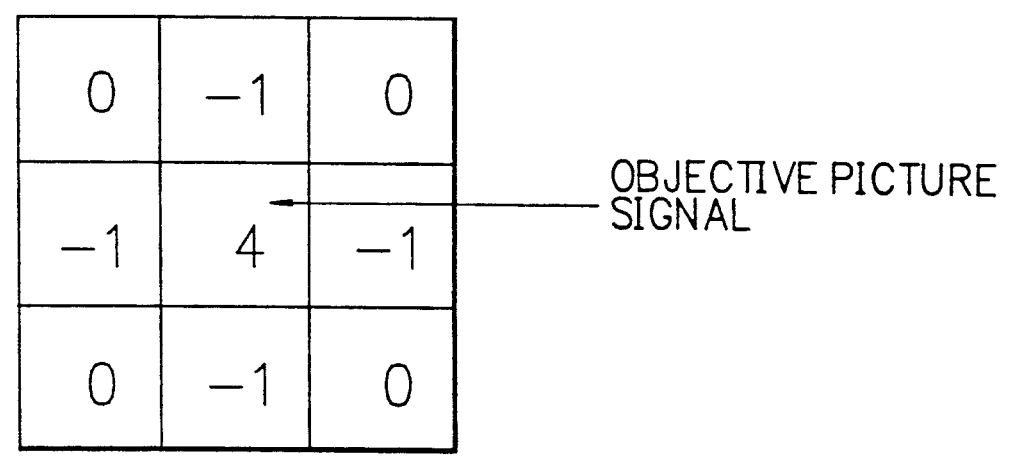

FIG. 3 shows an example of coefficient values of a high-pass filter constituted with 3×3 pixels.

Furthermore, in this embodiment, although there are adopted two density threshold values i.e. the density threshold values 5 and 6, the identical effect may also be attained with only one density threshold value. For example, in a case where the density threshold value 5 is set to a value associated with level 255, when the density variation of an objective pixel is less than the density variation threshold value 8 and the density level is larger than the density threshold value 6, the pixel is assumed to be in the picture area. Moreover, in a case where the density threshold value 6 is set to a value of level 0, when the density variation is less than the density variation threshold value 8 and the density level is less than the density threshold value 5, the pixel is assumed to be in the picture area.

As described above, with the provision of the image area determining apparatus having a simple configuration in accordance with the present invention, there can be attained an advantageous effect that the character and the picture areas can be correctly determined depending on density information of an original document.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An apparatus for characterizing an image area of a multi-value image, comprising:

density value comparing means for comparing a density value of a pixel signal comprising a multi-value image inputted thereto with each of two preset density threshold values, thereby producing information denoting whether or not said density value of said pixel signal is within a range between said two density threshold values;

density value variation amount comparing means for comparing an amount of variation in the density value of said pixel signal with a preset density variation threshold value, thereby generating information designating whether or not said variation amount of the density value of said pixel signal is less than said density variation threshold value; and area determining means for receiving information respectively outputted from said density value comparing means and said density value variation amount comparing means to characterize an image area corresponding to said pixel signal, said area determining means determining that said pixel signal corresponds to a picture area when said density value of said pixel signal is within said range between said two density threshold values and said density value variation amount of said pixel signal is less than said density variation threshold value; and said area determining means determining any area other than said picture area to be a character area.

2. An apparatus as claimed in claim 1, wherein said density value comparing means includes:

a first register and a second register for respectively storing therein said two preset density threshold values;

a first comparator for comparing said density value of said pixel with a first preset density threshold value kept in said first register;

a second comparator for comparing said density value of said pixel with a second preset density threshold value kept in said second register; and an AND gate for producing as an output therefrom a logical product between an output from said first comparator and an output from said second comparator.

3. An apparatus as claimed in claim 2, wherein each of said first and second comparators includes an inverter and an adder.

4. An apparatus as claimed in claim 2, wherein each of said first and second comparators includes a read-only memory.

5. An apparatus as claimed in claim 1, wherein said density value variation amount comparing means includes:

a shift register for temporarily storing therein a second pixel signal of said multi-value image;

a difference computing unit for determining a difference between said density value of the first-mentioned pixel signal and a density value of said second pixel signal which is stored in said shift register and which is adjacent to said first-mentioned pixel signal; and a comparator for comparing an output from said difference computing unit with said density variation threshold value.

6. An apparatus in accordance with claim 1, wherein said density value variation amount comparing means includes:

a memory for storing therein a plurality of second pixel signals of said multi-value image;

a multiplier for respectively multiplying predetermined weighting coefficients by respective density values corresponding to said plurality of second pixel signals, the plurality of second pixel signals being adjacent to the first-mentioned pixel signal and being read from said memory;

a mean value generating circuit for producing a mean value of outputs from said multiplier;

a difference computing means for determining a difference between said density value of the said first-mentioned pixel signal and an output from said means value generating circuit; and a comparator for comparing an output from said difference computing unit with said density variation threshold value.

7. An apparatus as claimed in claim 1, wherein said area determining means includes an AND gate.

8. An apparatus as claimed in claim 1, wherein said area determining means further includes storing means for storing therein decision results of said density value comparing means and said density value variation comparing means for pixel signals corresponding to an area in the vicinity of the first-mentioned pixel signal, thereby characterizing said image area of the multi-value image based on said decision results stored in said storing means.

9. An apparatus as claimed in claim 1, further comprising:
a dithering circuit for processing a pixel signal comprising the multi-value image according to a dithering method using a pseudo half tone to binarize said pixel signal;
a comparator for comparing said pixel signal comprising the multi-value image with a predetermined threshold value to conduct a simple binarization of said pixel signal; and
selecting means responsive to an output from said area determining mean for selecting either one of an output from said dithering circuit and an output from said comparator.

* * * * *